(12) United States Patent
Sakaida

(10) Patent No.: US 6,744,920 B1
(45) Date of Patent: Jun. 1, 2004

(54) METHOD, APPARATUS, AND RECORDING MEDIUM FOR PROCESSING IMAGE DATA TO OBTAIN COLOR-BALANCE ADJUSTED IMAGE DATA BASED ON WHITE-BALANCE ADJUSTED IMAGE DATA

(75) Inventor: Hideyuki Sakaida, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 617 days.

(21) Appl. No.: 09/641,816

(22) Filed: Aug. 18, 2000

(30) Foreign Application Priority Data

Aug. 18, 1999 (JP) ............................ 11-231215
Jun. 9, 2000 (JP) ...................... 2000/173245

(51) Int. Cl.$^7$ ................................. G06K 9/00
(52) U.S. Cl. ........................................ 382/167
(58) Field of Search ................. 358/515–517; 382/162–167; 348/223.1–226; 396/287–296

(56) References Cited

U.S. PATENT DOCUMENTS 5,619,347 A * 4/1997 Taniguchi et al. .......... 358/516
6,160,579 A * 12/2000 Shiraiwa et al. ............ 348/224
6,201,530 B1 * 3/2001 Thadani et al. ............. 345/593
6,411,331 B1 * 6/2002 Sansom-Wai et al. .... 7348/223
6,505,002 B2 * 1/2003 Fields ......................... 396/287

FOREIGN PATENT DOCUMENTS

EP 1045594 A2 * 10/2000 ............ H04N/9/73

* cited by examiner

Primary Examiner—Jingge Wu
(74) Attorney, Agent, or Firm—Birch, Stewart, Kolasch & Birch, LLP (57) ABSTRACT

When carrying out further color balance adjustment processing on color-balance adjusted image data having been through color balance adjustment processing, processing performance of the further color balance adjustment processing is sufficiently used. In a digital camera, by carrying out processing such as first AWB processing and chroma enhancement processing on original image data obtained by photographing, output image data are obtained. The output image data are then input to a printer. In the printer, processing which is the inverse of processing carried out in processing means of the digital camera and inverse AWB processing which is the inverse of the first AWB processing is carried out on the output image data, and inverse AWB image data which can be regarded as the original image data are obtained. Processed image data are then obtained by carrying out second AWB processing different from the first AWB processing on the inverse AWB image data, and a print is generated by output means based on the processed image data.

7 Claims, 5 Drawing Sheets

METHOD, APPARATUS, AND RECORDING MEDIUM FOR PROCESSING IMAGE DATA TO OBTAIN COLOR-BALANCE ADJUSTED IMAGE DATA BASED ON WHITE-BALANCE ADJUSTED IMAGE DATA

BACKGROUND OF THE INVENTION

1. Field of the Invention

The present invention relates to an image processing method and an image processing apparatus for carrying out color balance adjustment processing on an image obtained by using a digital camera when the image is output from a printer or the like, and also relates to a computer-readable recording medium storing a program to cause a computer to execute the image processing method.

2. Description of the Related Art

In a digital electronic still camera (hereinafter called a digital camera), an image obtained by photographing is recorded as digital image data in a recording medium such as an IC card or a built-in memory installed in the digital camera. Based on the digital image data having been recorded, the photographed image can be reproduced as a hard copy such as a print or a soft copy on a display device. When an image obtained by a digital camera is reproduced as has been described above, the image is expected to have as high a quality as a photograph printed from a negative film.

Meanwhile, human vision has a mechanism called chromatic adaptation for perceiving white paper as white not as bluish or reddish even in daylight or in light from a fluorescent lamp or a tungsten light each having a different spectrum energy distribution from normal daylight. Taking such chromatic adaptation into consideration, a digital camera having a function (an AWB function) has been proposed for carrying out automatic white balance adjustment processing (AWB processing) in accordance with a light source used at the time of photographing on original image data representing a photographed image so as to obtain an image not depending on a color of the light source such as tungsten light, light from a fluorescent lamp, or daylight.

Furthermore, a digital camera for outputting image data after image processing such as chroma enhancing processing on the image data so as to cause a color to become adequate when displayed on a CRT monitor has been known, since image data obtained by a digital camera are frequently displayed on a CRT monitor.

Meanwhile, when image data obtained by a digital camera are output as a hard copy from a printer or the like, the printer carries out AWB processing adequate for printing on the image data and the image data after the processing are printed.

Due to limitation caused by processing speed or hardware, the AWB processing carried out in a digital camera is comparatively simple processing for adjusting a gain of each color by equalizing averages of RGB colors, assuming an average of all pixel values being gray. Meanwhile, a printer can carry out more sophisticated AWB processing than that of a digital camera. For example, as has been described in Japanese Patent Application No. 11(1999)-70186, RGB values of each pixel are converted into chromaticity values to find averages of the chromaticity values. The averages are then converted into physiological primary colors and assumed to be a neutral point of a light source used at the time of photographing. The chromaticity values are converted so as to cause the physiological primary colors to be equal to physiological primary colors of a reference light source for photographing. The converted chromaticity values are then converted into RGB signals.

However, since image data output from a digital camera have been subjected to AWB processing, colors look different from colors in an original image. Therefore, for image data obtained by a digital camera, the function of sophisticated AWB processing carried out by a printer is not fully used. In the case where the digital camera carries out image processing such as chroma enhancing processing as well as the AWB processing, image data obtained by the digital camera have distorted color balance. As a result, regardless of sophisticated AWB processing carried out on the image data, an adequate neutral point cannot be set and a high quality image cannot be obtained.

The present invention has been conceived based on consideration of the above problems. An object of the present invention is therefore to provide an image processing method and an image processing apparatus for carrying out adequate color balance adjustment processing such as AWB processing on image data obtained by a digital camera, and also to provide a computer-readable recording medium storing a program to cause a computer to execute the image processing method.

SUMMARY OF THE INVENTION

A first image processing method of the present invention is a method of obtaining color-balance adjusted image data by carrying out color balance adjustment processing on white-balance adjusted image data obtained by carrying out, on original image data, white balance adjustment processing using gain adjustment in a color space in which the original image data have been obtained. The image processing method comprises the steps of:

obtaining inverse white-balance adjusted image data by carrying out, on the white-balance adjusted image data, inverse white balance adjustment processing which is inverse processing of the white balance adjustment processing; and obtaining the color-balance adjusted image data by carrying out the color balance adjustment processing on the inverse white-balance adjusted image data.

The "original image data" refer to image data before the white balance adjustment processing. Not only image data immediately after photographing by a digital camera but also image data after any processing, such as image data after standardization processing, can be used as the original image data, as long as the white balance adjustment processing has not been carried out.

The "color space in which the original image data have been obtained" means a color space of a sensor such as CCDs installed in the digital camera used for obtaining the original image data. For example, an RGB color space or a CMY color space can be used.

The "white balance adjustment processing using gain adjustment in a color space in which the original image data have been obtained" refers to processing for adjusting a gain of each color in the color space of the sensor for obtaining the original image data such as the RGB color space and the CMY color space so that a difference between neutral points depending on a light source used upon viewing the original image data and on a light source used at the time of photographing can be corrected.

The "color balance adjustment processing" refers to processing for correcting the difference between the neutral points depending on the light source used at the time of photographing an image and viewing the image. For example, comparatively sophisticated processing such as the processing described in Japanese Patent Application No. 11(1999)-70186 is an example of the color balance adjustment processing.

The "inverse white balance adjustment processing which is inverse processing of the white balance adjustment processing" means processing for restoring the white-balance adjusted image data to the original image data. Precisely speaking, the "inverse white-balance adjusted image data" obtained by carrying out the inverse white balance adjustment processing are not exactly the same as the original image data immediately after photographing, due to a calculation error or clipping. However, the inverse white-balance adjusted image data can be regarded as the original image data immediately after photographing.

In the first image processing method of the present invention, it is preferable for the inverse white balance adjustment processing to be carried out on the white-balance adjusted image data, based on information when carrying out the white balance adjustment processing.

As the "information when carrying out the white balance adjustment processing", parameters such as the gain of each color adjusted during the white balance processing can be used, for example.

As the "predetermined image processing", color conversion processing for enhancing chroma or density conversion processing for converting density of a scene can be used, for example.

A second image processing method of the present invention is an image processing method for obtaining color-balance adjusted image data by carrying out color balance adjustment processing on white-balance adjusted image data obtained by carrying out white balance adjustment processing on original image data by using gain adjustment in a color space in which the original image data have been obtained and by carrying out predetermined image processing thereon. The image processing method comprises the steps of:

obtaining inverse white-balance adjusted image data by carrying out, on the white-balance adjusted image data, inverse image processing which is inverse processing of the predetermined image processing and inverse white balance adjustment processing which is inverse processing of the white balance adjustment processing; and obtaining the color-balance adjusted image data by carrying out the color balance adjustment processing on the inverse white-balance adjusted image data.

In the second image processing method of the present invention, it is preferable for the inverse white balance adjustment processing to be carried out on the white-balance adjusted image data, based on information when carrying out the white balance adjustment processing.

In the second image processing method of the present invention, it is preferable for the inverse image processing to be carried out on the white-balance adjusted image data, based on information when carrying out the predetermined image processing.

As the "information when carrying out the predetermined image processing", information representing the amount of colors or tones changed by the predetermined image processing can be used. More specifically, in the case where the predetermined image processing is density conversion processing or color conversion processing for enhancing chroma, information representing the amount of chroma or density having been changed through the processing can be used.

A first image processing apparatus of the present invention is an apparatus for obtaining color-balance adjusted image data by carrying out color balance adjustment processing on white-balance adjusted image data obtained by carrying out, on original image data, white balance adjustment processing using gain adjustment in a color space in which the original image data have been obtained. The image processing apparatus comprises:

inverse processing means for obtaining inverse white-balance adjusted image data by carrying out, on the white-balance adjusted image data, inverse white balance adjustment processing which is inverse processing of the white balance adjustment processing; and color balance adjustment processing means for obtaining the color-balance adjusted image data by carrying out the color balance adjustment processing on the inverse white-balance adjusted image data.

In the first image processing apparatus of the present invention, it is preferable for the inverse processing means to carry out the inverse white balance adjustment processing on the white-balance adjusted image data, based on information when carrying out the white balance adjustment processing.

A second image processing apparatus of the present invention is an apparatus for obtaining color-balance adjusted image data by carrying out color balance adjustment processing on white-balance adjusted image data obtained by carrying out, on original image data, white balance adjustment processing using gain adjustment in a color space in which the original image data have been obtained and by carrying out predetermined image processing thereon. The image processing apparatus comprises:

inverse processing means for obtaining inverse white-balance adjusted image data by carrying out, on the white-balance adjusted image data, inverse image processing which is inverse processing of the predetermined image processing and inverse white balance adjustment processing which is inverse processing of the white balance adjustment processing; and color balance adjustment processing means for obtaining the color-balance adjusted image data by carrying out the color balance adjustment processing on the inverse white-balance adjusted image data.

In the second image processing apparatus of the present invention, it is preferable for the inverse processing means to carry out the inverse white balance adjustment processing on the white-balance adjusted image data, based on information when carrying out the white balance adjustment processing.

Furthermore, in the second image processing apparatus of the present invention, it is preferable for the inverse processing means to carry out the inverse image processing on the white-balance adjusted image data, based on information when carrying out the predetermined image processing.

The first image processing method and the second image processing method of the present invention may be provided as programs stored in a computer-readable recording medium to cause a computer to execute the methods.

Furthermore, the first image processing apparatus and the second image processing apparatus may be installed in an output apparatus such as a printer.

According to the present invention, the inverse white-balance adjusted image data are obtained by carrying out the inverse white balance adjustment processing on the white-balance adjusted image data, and the inverse white-balance adjusted image data are subjected to the color balance adjustment processing. Therefore, the color-balance adjusted image data obtained in this manner can be regarded as image data having a color balance almost the same as the color balance obtained by carrying out color balance adjustment processing directly on the original image data. Consequently, the color-balance adjusted image data sufficiently reflecting processing performance of color balance adjustment processing can be obtained without being affected by white balance adjustment processing.

In the case where the white-balance adjusted image data have been subjected to the white balance adjustment processing and the predetermined image processing, the inverse white-balance adjusted image data are obtained by carrying out the inverse image processing which is the inverse processing of the predetermined image processing and the inverse white balance adjustment processing on the white-balance adjusted image data. By carrying out the color balance adjustment processing on the inverse white-balance adjusted image data, the color-balance adjusted image data are obtained. Therefore, the color-balance adjusted image data obtained in this manner have been subjected to color balance adjustment processing almost the same as in the case of carrying out direct color balance processing on the original image data. Consequently, processing can be carried out on inverse white-balance adjusted image data which can be regarded as the original image data and have less affected color balance than in the case of carrying out the color balance adjustment processing on the white-balance adjusted image data. In this manner, the color-balance adjusted image data sufficiently reflecting processing performance of the color balance adjustment processing can be obtained by adequately setting a neutral point, without being affected by the white balance adjustment processing and by the predetermined image processing.

DESCRIPTION OF THE PREFERRED EMBODIMENTS

Hereinafter, embodiments of the present invention will be explained with reference to the accompanying drawings.

Figure 1:
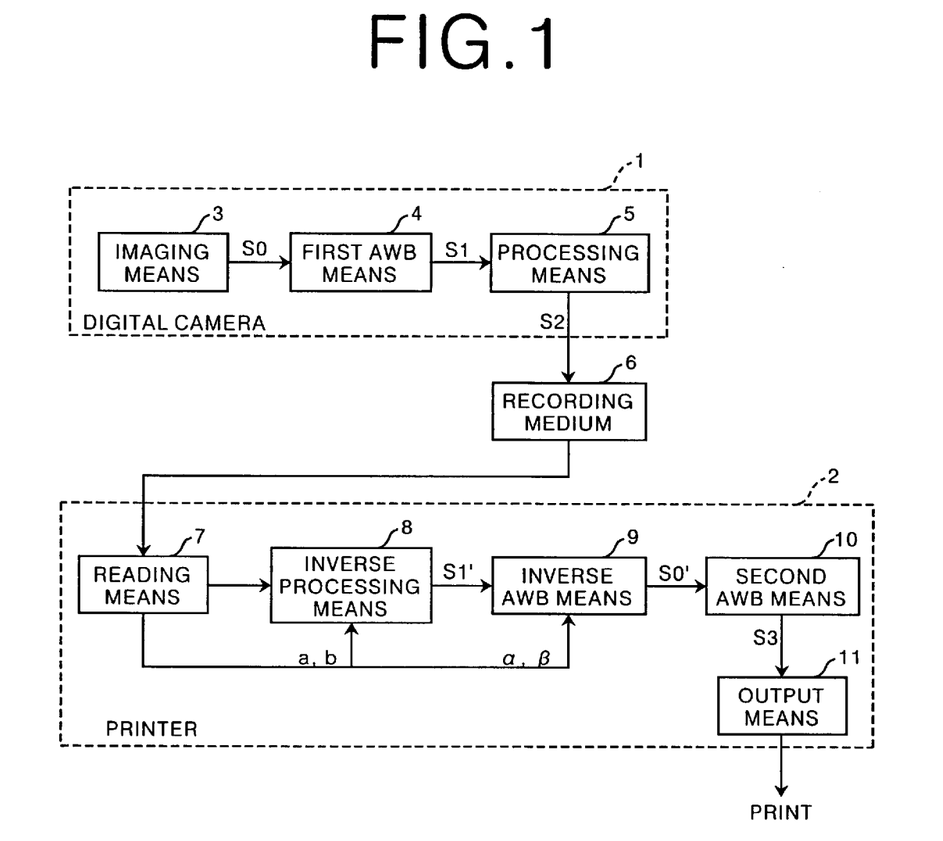
FIG. 1 is a block diagram showing an outline configuration of an image output system adopting an image processing apparatus according to an embodiment of the present invention.

FIG. 1 is a block diagram showing an outline configuration of an image output system adopting an image processing apparatus according to an embodiment of the present invention. As shown in FIG. 1, the image output system in this embodiment generates a print by inputting output image data S2 obtained by a digital camera 1 to a printer 2.

The digital camera 1 comprises imaging means 3 for obtaining original image data S0 by photographing a scene, first AWB means 4 for obtaining AWB image data S1 by carrying out first AWB processing on the original image data S0 obtained by the imaging means 3, and processing means 5 for obtaining the output image data S2 by carrying out image processing on the AWB image data S1. The output image data S2 are recorded in a recording medium 6 such as a memory stick or a memory card.

The printer 2 comprises reading means 7 for reading the output image data S2 from the recording medium 6, inverse processing means 8 for obtaining inverse-processed image data S1' by carrying out inverse image processing which is inverse processing of the processing carried out by the processing means 5 in the digital camera 1, inverse AWB means 9 for obtaining inverse AWB image data S0' by carrying out, on the inverse-processed image data S1', inverse AWB processing which is inverse processing of the AWB processing carried out by the first AWB means 4, second AWB means 10 for obtaining processed image data S3 by carrying out second AWB processing different from the first AWB processing on the inverse AWB image data S0', and output means 11 for outputting the processed image data S3 as a hard copy.

The imaging means 3 comprises means necessary for photographing a scene, such as a lens, RGB filters, and CCDs. The image data S0 obtained by the imaging means 3 comprise 3 signal values R0, G0, and B0. Let spectral reflectivity of a scene be A(λ), and let filter characteristics of the RGB filters in the imaging means 3 be r(λ), g(λ), and b(λ). The signal values R0, G0 and B0 are expressed by Equation (1) below:

$$R0 = \int A(\lambda)r(\lambda)d\lambda \qquad (1)$$

$$G0 = \int A(\lambda)g(\lambda)d\lambda$$

$$B0 = \int A(\lambda)b(\lambda)d\lambda$$

In the first AWB means 4, parameters α and β to be multiplied with integrals of the signal values R0 and B0 are determined so as to equalize the integrals of the signal values R0, G0 and B0 in an entire image area represented by the original image data S0, as shown in Equation (2) below:

$$\alpha \int_{entire\ image} R0 = \int_{entire\ image} G0 = \beta \int_{entire\ image} B0 \qquad (2)$$

Signal values R1, G1, and B1 comprising the AWB image data S1 are then found according to the following Equation (3):

$$R1 = \alpha R0$$

$$G1 = G0$$

$$B1 = \beta B0 \qquad (3)$$

In the processing means 5, image processing comprising scene density conversion processing and chroma enhancement processing is carried out to generate the output image data S2. The scene density conversion processing is processing for converting the signal values R1, G1 and B1 comprising the AWB image data S1 into signal values R2, G2, and B2 which are RGB signal values for reproduction on a monitor or the like. More specifically, the signal value R2 can be found according to the following Equation (4) below:

$$R2 = 1.099 R1^{0.45} - 0.099 \text{ (if } R1 \geq 0.018)$$

$$R2 = 4.50 R1 \text{ (if } R1 < 0.018)$$

Likewise, the signal values G2 and B2 can also be found by the above operation replacing R with G or B.

The chroma enhancement processing converts the signal values R2, G2, and B2 obtained by the scene density conversion processing into YCC luminance color-difference components as shown in Equation (5) below, and obtains a component Cb' and a component Cr' by multiplying a component Cb and a component Cr obtained according to Equation (5) with parameters a and b, as shown in Equation (6) below:

$$Y = 0.299 R2 + 0.587 G2 + 0.114 B2$$

$$Cb = (B2-Y)/1.772$$

$$Cr = (R2-Y)/1.402 \qquad (5)$$

$$Cb' = a \times Cb + 0.5$$

$$Cr' = b \times Cr + 0.5 \qquad (6)$$

Since $-0.5 \leq Cb \leq 0.5$ and $-0.5 \leq Cr \leq 0.5$, 0.5 is added to Cb and Cr in Equation (6) so as to cause Cb and Cr to become $0 \leq Cb \leq 1$ and $0 \leq Cr \leq 1$.

The parameters $\alpha$ and $\beta$ in Equation (3) and parameters a and b in Equation (6) are recorded in the recording medium 6, together with the output image data S2.

The reading means 7 of the printer 2 reads out the output the image data S2 and the parameters $\alpha$, $\beta$, a and b from the recording medium 6. The inverse processing means 8 carries out the inverse image processing, which is the inverse processing of the image processing carried out in the processing means 5 in the digital camera 1, on the output image data S2. More specifically, the component Cr and Cb are calculated by using the parameters a and b according to the following Equation (7):

$$Cb = Cb'/a - 0.5$$

$$Cr = Cr'/b - 0.5 \qquad (7)$$

The signal values R2, G2, and B2 are found by solving Equation (5) and the signal value R1 is then found according to the following Equation (8):

$$R1 = ((R2 + 0.099)/1.099)^{1/0.45} \text{ (if } R2 \geq 0.081)$$

$$R1 = R2/4.5 \text{ (if } R2 < 0.081) \qquad (8)$$

Likewise, the signal values G1 and B1 are found according to Equation (8) replacing R with G or B. The signal values R1, G1, and B1 comprise the inverse-processed image data S1'.

The inverse AWB processing means 9 obtains the inverse AWB image data S0' by carrying out the inverse AWB processing, which is the inverse of the AWB processing carried out by the first AWB means 4, on the inverse-processed image data S1'. More specifically, processing shown by Equation (9) below using the parameters $\alpha$ and $\beta$ is carried out on the signal values R1, G1 and B1 comprising the inverse-processed image data S1' and the inverse AWB image data S0' comprising signal values R0', G0' and B0' are obtained:

$$R0' = R1/\alpha$$

$$G0' = G1$$

$$B0' = B1/\beta \qquad (9)$$

The inverse AWB image data S0' are not exactly the same as the original image data S0 immediately after photographing, due to a calculation error or clipping. However, the inverse AWB image data S0' can be regarded as the original image data S0 immediately after photographing.

In the second AWB means 10, AWB processing is carried out on the inverse AWB image data S0' according to the method described in Japanese Patent Application No. 11(1999)-70186, for example. Hereinafter, the AWB processing carried out in the second AWB means 10 will be explained. The signal values R0', G0' and B0' refer to tristimulus values R0', G0' and B0'. First, the tristimulus values R0', G0', and B0' comprising the inverse AWB image data S0' are converted into CIE1931XYZ tristimulus values and CIE1976uv chromaticity values according to the following Equations (11) and (12):

$$\begin{matrix} X & & R0' \\ Y & = |A| \cdot & G0' \\ Z & & B0' \end{matrix} \qquad (11)$$

$$u = 4X/(X + 15Y + 3Z)$$

$$v = 9Y/(X + 15Y + 3Z) \qquad (12)$$

where the matrix $|A|$ is a matrix for converting the tristimulus values R0', G0', and B0' into the tristimulus values X, Y, and Z, and the following numbers can be used, for example:

$$|A| = \begin{matrix} 0.4124 & 0.3576 & 0.1805 \\ 0.2126 & 0.7152 & 0.0722 \\ 0.0193 & 0.1192 & 0.9505 \end{matrix} \qquad (13)$$

The tristimulus values X, Y, and Z may be found by using a look-up table instead of the matrix $|A|$.

Averages u0 and v0 of the chromaticity values u and v found by using Equation (12) are calculated according to Equation (14) below:

$$u0 = \Sigma u/n$$

$$v0 = \Sigma v/n \qquad (14)$$

where n is the number of pixels. The averages u0 and v0 are converted into physiological primary colors L0, M0 and S0 according to Equation (15)~(17) below:

$$sx = 9.0 \times u0(6.0 \times u0 - 16.0 \times v0 + 12.0)$$

$$sy = 4.0 \times v0(6.0 \times u0 - 16.0 \times v0 + 12.0) \qquad (15)$$

$$X0 = sx/sy$$

$$Y0 = 100.0$$

$$Z0 = (1.0 - sx - sy)sy \qquad (16)$$

$$\begin{matrix} L0 & & X0 \end{matrix} \qquad (17)$$

-continued $$M0 = |B| \cdot Y0$$
$$S0 \quad\quad Z0$$

where the matrix |B| is a matrix for converting the tristimulus values X0, Y0 and Z0 into the physiological primary colors M0, L0 and S0. The following matrix can be used as the matrix |B|:

$$|B| = \begin{matrix} 0.3897 & 0.6890 & -0.0787 \\ -0.2298 & 1.1834 & 0.0464 \\ 0 & 0 & 1.0 \end{matrix} \quad (18)$$

Furthermore, the tristimulus values X, Y, and Z found by using Equation (11) are converted into physiological primary colors L, M, and S according to Equation (17).

The physiological primary colors L, M, and S are subjected to chromatic adaptation conversion according to Equations (19) and (20), and converted physiological primary colors L', M', and S' are obtained:

$$\begin{matrix} L' \\ M' \\ S' \end{matrix} = |C| \cdot \begin{matrix} L \\ M \\ S \end{matrix} \quad (19)$$

where $$|C| = \begin{matrix} (a \cdot Ln + (1-a) \cdot L0)/L0 \\ (a \cdot Mn + (1-a) \cdot M0)/M0 \\ (a \cdot Sn + (1-a) \cdot S0)/S0 \end{matrix} \quad (20)$$

L0, M0 and S0 are physiological primary colors of the chromaticity value averages found by using Equation (17) and regarded as a white color of a photographing light source used when obtaining the original image data S0. Ln, Mn, and Sn are chromaticities of a white color of a reference photographing light source upon obtaining the original image data S0. When Ln, Mn, and Sn are unknown, chromaticity (un, vn) of a neutral point equivalent to D50–D60 daylight can be used for Ln, Mn, and Sn. a is a value indicating an adaptation state, and 1 is normally used for a.

The converted physiological primary colors L', M40 and S' are converted into processed tristimulus values R3, G3, and B3 according to Equation (21) below and the processed image data S3 are obtained:

$$\begin{matrix} R3 \\ G3 \\ B3 \end{matrix} = |A|^{-1} |B|^{-1} \cdot \begin{matrix} L' \\ M' \\ S' \end{matrix} \quad (21)$$

Figure 2:
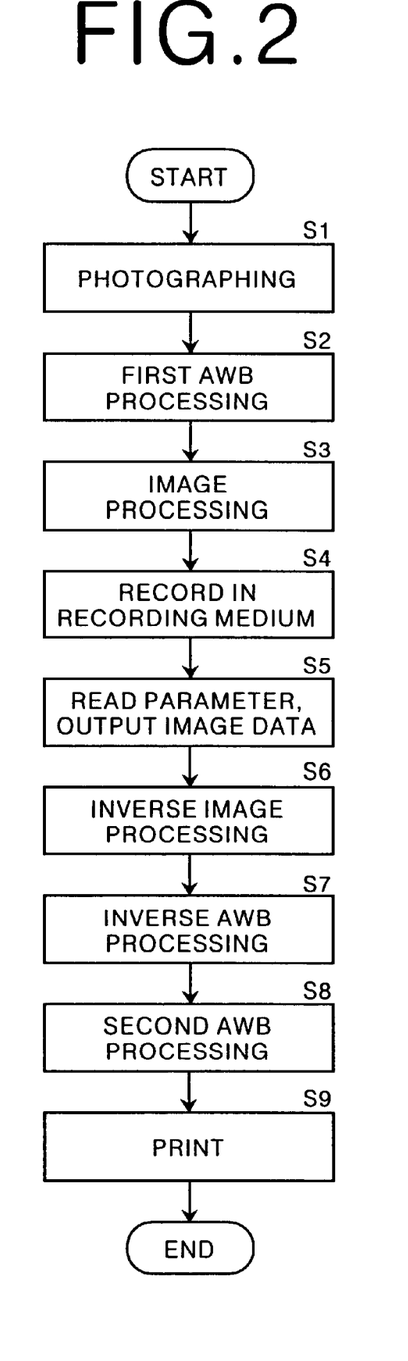
FIG. 2 is a flow chart showing processing carried out in the embodiment.

An operation of this embodiment described above will be explained next. FIG. 2 is a flow chart showing the operation of this embodiment. The imaging means 3 in the digital camera 1 carries out photographing of a scene to obtain the original image data S0 (Step S1). The first AWB means 4 carries out the first AWB processing according to Equations (2) and (3) on the original image data S0 and the AWB image data S1 are obtained (Step S2). In the processing means 5, the image processing comprising the scene density conversion processing and the chroma enhancement processing is carried out on the AWB image data S1 according to Equations (4) to (6), and the output image data S2 are obtained (Step S3). The output image data S2 are recorded in the recording medium 6, together with the parameters α, β, a and b (Step S4). The procedure described above is the procedure carried out in the digital camera 1.

In the printer 2, reading means 7 reads the output image data S2 and the parameters α, β, a and b from the recording medium 6 (Step S5). The inverse processing means 8 in the printer 2 carries out the inverse image processing, which is the inverse processing of the image processing carried out by the processing means 5 in the digital camera 1, on the output image data S2 according to Equations (7) and (8) and the inverse-processed image data S1' are obtained (Step S6). The inverse AWB means 9 then carries out the inverse AWB processing, which is the inverse processing of the AWB processing carried out by the first AWB means 4 in the digital camera 1, on the inverse-processed image data S1' according to Equation (9), and the inverse AWB image data S0' are obtained (Step S7). In the second AWB means 10, the second AWB processing is carried out on the inverse AWB image data S0' according to Equations (11) to (21), and the processed image data S3 are obtained (Step S8). The processed image data S3 are subjected to other kinds of processing such as color conversion processing adequate for printing if necessary, and output by the output means 11 (Step S9) and the procedure is completed.

As has been described above, in this embodiment, the inverse image processing, which is the inverse processing of the scene density conversion processing and the chroma enhancement processing carried out by the processing means 5, is carried out on the output image data S2 obtained by the digital camera 1, and the inverse AWB image data S0' are obtained by carrying out the inverse AWB processing which is the inverse of the first AWB processing. The processed image data S3 obtained by carrying out the second AWB processing on the inverse AWB image data S0' can be regarded as image data having been subjected to color balance adjustment almost the same as color balance adjustment in the case of carrying out the second AWB processing directly on the original image data. Therefore, the processed image data S3 reflecting processing performance of the second AWB processing which is more sophisticated than the first AWB processing carried out in the digital camera 1 can be obtained. In this manner, a high quality print can be generated.

Figure 3:
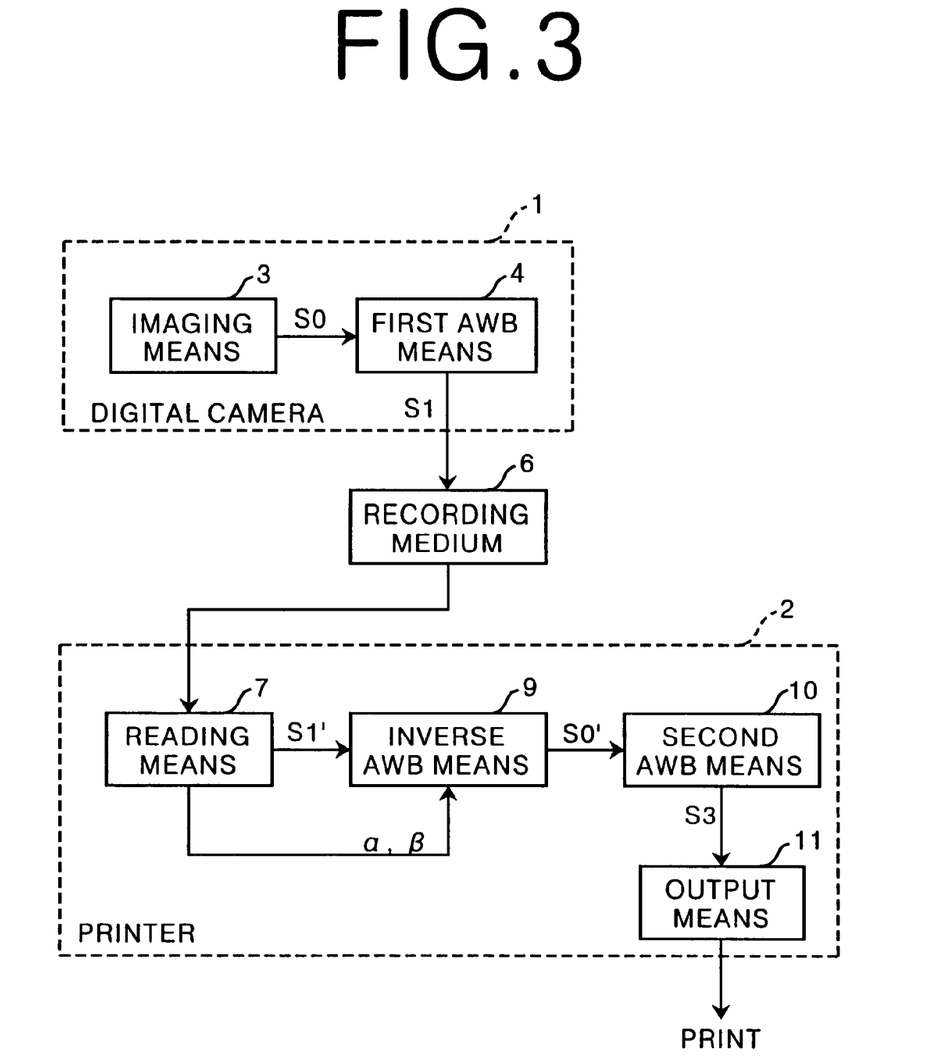
FIG. 3 is a block diagram showing an outline configuration of an image output system according to another embodiment of the present invention.

In the above embodiment, the image processing comprising the scene density conversion processing and the chroma enhancement processing is carried out by the processing means 5, in addition to the first AWB processing in the digital camera 1. However, some digital cameras do not comprise the processing means 5. In this case, image data output from the digital camera 1 are the AWB image data S1 having been subjected to the first AWB processing. Therefore, in this case, the inverse AWB image data S0' can be obtained by carrying out the processing by the inverse AWB means 9 in the printer 2. A configuration of an image output system comprising the printer 2 for carrying out this kind of processing is shown in FIG. 3 as another embodiment.

In the previous embodiment, the parameters α, β, a and b are recorded in the recording medium 6, together with the output image data S2. However, the printer 2 may have the parameters α, β, a and b. In this manner, recording the parameters α, β, a and b in the recording medium 6 becomes unnecessary in the digital camera 1 and photographing can be carried out faster.

Furthermore, in the previous embodiment, the image processing apparatus of the present invention is installed in the printer. However, it is needless to say that the image processing apparatus of the present invention can be used as a single image processing apparatus.

Moreover, in the previous embodiment, the AWB processing according to Equations (2) and (3) is carried out by the first AWB means 4 in the digital camera 1. However, the AWB processing is not limited to this processing. The AWB processing described in Japanese Patent Application No. 11(1999)-70186 is also carried out in the second AWB means 10 in the printer 2. However, the AWB processing is not limited to this AWB processing and various kinds of AWB processing can be used.

For example, the AWB processing may be carried out by the second AWB means 10 according to a method using a color adaptive prediction equation by von Kries. Consider the case of observing, under a light source 2, an image photographed under a light source 1. Let tristimulus values based on physiological primary colors of neutral points of the light source 1 and the light source 2 be $L_{1w}$, $M_{1w}$, and $S_{1w}$, and $L_{2w}$, $M_{2w}$, and $S_{2w}$, respectively. The method converts LMS tristimulus values $(L, M, S)_1$ under the light source 1 before AWB processing into LMS tristimulus values $(L, M, S)_2$ of the image under the light source 2 after white balance adjustment, as shown by Equation (22) below:

$$\begin{pmatrix} L \\ M \\ S \end{pmatrix}_2 = \begin{pmatrix} L_{2w}/L_{1w} & 0 & 0 \\ 0 & M_{2w}/M_{1w} & 0 \\ 0 & 0 & S_{2w}/S_{1w} \end{pmatrix} \begin{pmatrix} L \\ M \\ S \end{pmatrix}_1 \quad (22)$$

However, the method according to the von Kries: color adaptive prediction equation converts colors other than the white color, such as a complexion, into unnatural colors in the case of an image photographed under a specific light source such as fluorescent light or tungsten light, although the method can adequately adjust the colors other than the white color in the case of an image photographed in daylight.

Therefore, the AWB processing may be carried out by using a matrix having non-zero values in non-diagonal elements for the conversion of the physiological primary colors, instead of using the matrix having non-zero values only in diagonal elements thereof as shown in Equation (22). Hereinafter, this method will be explained below.

It is generally known that spectral reflectivity of an object in nature can be represented by 3 main components. Therefore, spectral reflectivity of an object having been photographed can be expressed as a linear combination shown in Equation (23) below, with the 3 main components $X_1(\lambda)$, $X_2(\lambda)$, and $X_3(\lambda)$ ($\lambda$: spectral frequency):

$$X(\lambda) = a_1 X_1(\lambda) + a_2 X_2(\lambda) + a_3 X_3(\lambda) \quad (23)$$

Here, $a_1$, $a_2$, and $a_3$ are weights for weighted addition of the main components.

Let a spectral radiation distribution of the light source 1 be $F(\lambda)$ and let L-cone, M-cone and S-cone of the tristimulus values be $\bar{l}(\lambda)$, $\bar{m}(\lambda)$, and $\bar{s}(\lambda)$. LMS tristimulus values $L_1$, $M_1$, and $S_1$ under the light source 1 become as follows:

$$L_1 = \int_{VIS} F(\lambda) x(\lambda) \bar{l}(\lambda) d\lambda \quad (24)$$

$$= a_1 \int_{VIS} F(\lambda) x_1(\lambda) \bar{l}(\lambda) d\lambda + a_2 \int_{VIS} F(\lambda) x_2(\lambda) \bar{l}(\lambda) d\lambda +$$

$$a_3 \int_{VIS} F(\lambda) x_3(\lambda) \bar{l}(\lambda) d\lambda$$

$$M_1 = \int_{VIS} F(\lambda) x(\lambda) \bar{m}(\lambda) d\lambda \quad (25)$$

$$= a_1 \int_{VIS} F(\lambda) x_1(\lambda) \bar{m}(\lambda) d\lambda + a_2 \int_{VIS} F(\lambda) x_2(\lambda) \bar{m}(\lambda) d\lambda +$$

$$a_3 \int_{VIS} F(\lambda) x_3(\lambda) \bar{m}(\lambda) d\lambda$$

$$S_1 = \int_{VIS} F(\lambda) x(\lambda) \bar{s}(\lambda) d\lambda \quad (26)$$

$$= a_1 \int_{VIS} F(\lambda) x_1(\lambda) \bar{s}(\lambda) d\lambda + a_2 \int_{VIS} F(\lambda) x_2(\lambda) \bar{s}(\lambda) d\lambda +$$

$$a_3 \int_{VIS} F(\lambda) x_3(\lambda) \bar{s}(\lambda) d\lambda$$

The integrations in Equations (24) to (26) are integrations in a visible-light range. However, the integrations may be carried out in an all-spectral range. Since the spectral radiation distribution $F(\lambda)$ of the light source 1, the main components $X_1(\lambda)$ $X_2(\lambda)$ and $X_3(\lambda)$, and the spectral sensitivity $\bar{l}(\lambda)$, $\bar{m}(\lambda)$, and $\bar{s}(\lambda)$ of the physiological primary colors are known, define $L_{1i}$, $M_{1i}$, and $S_{1i}$ as follows:

$$L_{1i} = \int_{VIS} F(\lambda) x_i(\lambda) \bar{l}(\lambda) d\lambda \quad (27)$$

$$M_{1i} = \int_{VIS} F(\lambda) x_i(\lambda) \bar{m}(\lambda) d\lambda \quad (i = 1 \ldots 3)$$

$$S_{1i} = \int_{VIS} F(\lambda) x_i(\lambda) \bar{s}(\lambda) d\lambda$$

The LMS tristimulus values of the object having the spectral reflectivity $X(\lambda)$ seen under the light source 1 become as follows:

$$\begin{pmatrix} L_1 \\ M_1 \\ S_1 \end{pmatrix} = \begin{pmatrix} L_{11} & L_{12} & L_{13} \\ M_{11} & M_{12} & M_{13} \\ S_{11} & S_{12} & S_{13} \end{pmatrix} \begin{pmatrix} a_1 \\ a_2 \\ a_3 \end{pmatrix} \quad (28)$$

Likewise, the LMS tristimulus values of the object having the spectral reflectivity $X(\lambda)$ seen under the light source 2 become as follows:

$$\begin{pmatrix} L_2 \\ M_2 \\ S_2 \end{pmatrix} = \begin{pmatrix} L_{21} & L_{22} & L_{23} \\ M_{21} & M_{22} & M_{23} \\ S_{21} & S_{22} & S_{23} \end{pmatrix} \begin{pmatrix} a_1 \\ a_2 \\ a_3 \end{pmatrix} \quad (29)$$

Eliminating $a_1$, $a_2$, and $a_3$ from Equations (28) and (29), the following Equation (30) can be obtained:

$$\begin{pmatrix} L_2 \\ M_2 \\ S_2 \end{pmatrix} = \begin{pmatrix} L_{21} & L_{22} & L_{23} \\ M_{21} & M_{22} & M_{23} \\ S_{21} & S_{22} & S_{23} \end{pmatrix} \begin{pmatrix} L_{11} & L_{12} & L_{13} \\ M_{11} & M_{12} & M_{13} \\ S_{11} & S_{12} & S_{13} \end{pmatrix}^{-1} \begin{pmatrix} L_1 \\ M_1 \\ S_1 \end{pmatrix} \quad (30)$$

Therefore, conversion from the LMS tristimulus values (called $y_1$ here) under the light source 1 into the LMS tristimulus values (called $y_2$ here) under the light source 2 can be expressed as follows:

$$y_2 = P_2 P_1^{-1} y_1 \quad (31)$$

where $$P_1 = \begin{pmatrix} L_{11} & L_{12} & L_{13} \\ M_{11} & M_{12} & M_{13} \\ S_{11} & S_{12} & S_{13} \end{pmatrix}$$

$$P_2 = \begin{pmatrix} L_{21} & L_{22} & L_{23} \\ M_{21} & M_{22} & M_{23} \\ S_{21} & S_{22} & S_{23} \end{pmatrix}$$

In this manner, the conversion can be carried out by using the 3×3 matrix $P_2 P_1^{-1}$ having non-zero non-diagonal elements.

Figure 4:
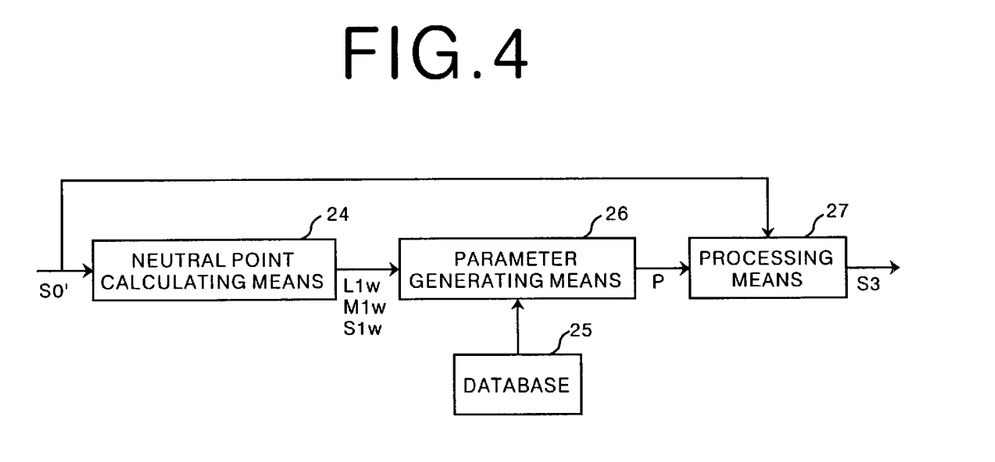
FIG. 4 is a block diagram showing an outline configuration of AWB means for carrying out another kind of AWB processing.

The AWB processing may be carried out in the following manner. FIG. 4 is a block diagram showing an outline configuration of AWB means for carrying out the following AWB processing in the second AWB means 10. As shown in FIG. 4, this AWB means comprises neutral point calculating means 24 for calculating, from the inverse AWB image data S0', the tristimulus values $L_{1w}$, $M_{1w}$, and $S_{1w}$ based on physiological primary colors of a neutral point in an image represented by the inverse AWB image data S0', a database 25 storing tristimulus values of a neutral point of each of light sources (hereinafter called known light sources) and parameters (hereinafter called known light source parameters) for converting tristimulus values under each of the known light sources into tristimulus values under a light source for observing the processed image data S3, parameter generating means 26 for generating a processing parameter P for carrying out the AWB processing on the inverse AWB image data S0' based on the known light source parameters stored in the database 25, and processing means 27 for obtaining the processed image data S3 by carrying out the AWB processing on the inverse AWB image data S0' based on the processing parameter P having been generated by the parameter generating means 26.

The image data S0 are obtained by photographing a scene with the digital camera 1 under a light source (light source 1), such as an ordinary fluorescent lamp, whose parameters for converting the tristimulus values thereof into the tristimulus values under the light source for observation are not known. The light source under which the processed image data S3 are viewed is the light source 2.

Since the inverse AWB image data S0' can be regarded as the image data obtained by the digital camera 1, the inverse AWB image data S0' comprise 8-bit signal values of RGB colors according to the ITU Rec. 709 standard, and the signal values are represented by R0', G0', and B0'.

The neutral point calculating means 24 converts the color signal value R0' comprising the inverse AWB image data S0' into a signal value R10 normalized to 0~1 according to the following Equations (32) and (33) which are equivalent to Equation (8):

$$R10 = \left(\frac{R0'' + 0.099}{1.099}\right)^{1/0.45} \quad (R0'' \geq 0.081) \tag{33}$$

$$R10 = R0''/4.5 \quad (R0'' < 0.081)$$

Likewise, signal values G10 and B10 are also found by the same operation described above.

Averages R11, G11, and B11 of the signal values R10, G10, and B10 are then found according to the following Equation (34) using N as the number of all pixels in the image represented by the inverse AWB image data S0':

$$R11 = \frac{1}{N} \int_{all\ pixels} R10 \tag{34}$$

$$G11 = \frac{1}{N} \int_{all\ pixels} G10$$

$$B11 = \frac{1}{N} \int_{all\ pixels} B10$$

The calculated averages R11, G11, and B11 are converted into CIE1931XYZ tristimulus values according to Equation (35) below:

$$\begin{pmatrix} X_{1w} \\ Y_{1w} \\ Z_{1w} \end{pmatrix} = \begin{pmatrix} 41.24 & 35.76 & 18.05 \\ 21.26 & 71.52 & 7.22 \\ 1.93 & 11.92 & 95.05 \end{pmatrix} \begin{pmatrix} R2 \\ G2 \\ B2 \end{pmatrix} \tag{35}$$

The calculated tristimulus values are defined as tristimulus values $X_{1w}$, $Y_{1w}$, and $Z_{1w}$ of the neutral point in the image represented by the image data S0.

The tristimulus values $X_{1w}$, $Y_{1w}$, and $Z_{1w}$ are converted into tristimulus values based on the physiological primary colors according to Equation (36) below:

$$\begin{pmatrix} L_{1w} \\ M_{1w} \\ S_{1w} \end{pmatrix} = \begin{pmatrix} 0.4002 & 0.7076 & -0.0808 \\ -0.2263 & 1.1653 & 0.0457 \\ 0.0 & 0.0 & 0.9182 \end{pmatrix} \begin{pmatrix} X_{1w} \\ Y_{1w} \\ Z_{1w} \end{pmatrix} \tag{36}$$

The tristimulus values are then used as the tristimulus values $L_{1w}$, $M_{1w}$, and $S_{1w}$ based on the physiological primary colors of the neutral point in the image represented by the inverse AWB image data S0' obtained from the image data S0 generated by photographing under the light source 1.

The database 25 stores the known light source parameters for converting the tristimulus values in each of the known light sources into the tristimulus values under the light source 2. The known light source parameters is the 3×3 matrix in Equation (31) above. The known light source parameters are stored in the database 25 in relation to the tristimulus values of the neutral points of the known light sources.

Calculation of the known light source parameters will be explained next. Spectral intensity distributions of the known light sources and the light source 2 for observation are known. For example, in the case where the processed image data S3 are printed, the light source for observation is CIE-D50. In the case where the processed image data S3 are reproduced on a monitor, the light source for observation is CIE-D65. Therefore, according to Equations (23)~(31), a 3×3 matrix $P_2 P_A^{-1}$ for converting LMS tristimulus values in a known light source A into the LMS tristimulus values under the light source 2 can be found as shown in Equation (37) below:

$$y_2 = P_2 P_A^{-1} y_A \tag{37}$$

where $y_2$ is the LMS tristimulus values under the light source 2, $y_A$ is the LMS tristimulus values under the known light source A, $P_2$ is a 3×3 matrix for finding the LMS values of the object having the spectral reflectivity $X(\lambda)$ observed under the light source 2, and $P_A$ is a 3×3 matrix for finding the LMS values of the object having the spectral reflectivity $X(\lambda)$ observed under the known light source A. The matrix $P_2 P_A^{-1}$ is stored in the database 25 as the known light source parameters. The matrix $P_2$ and the matrix $P_A^{-1}$ may be found separately so that the matrix $PA^{-1}$ is used as the known light source parameters.

The LMS tristimulus values under the light source 2 and under the known light source A may be found by using spectral reflectivity data of multiple colors such as 1269 colors in the Munsell color chip so that the matrix for converting the tristimulus values $y_A$ into the tristimulus values $y_2$ by using the least square method or the like can be used as the known light source parameters. Since the matrix found in the above manner is equivalent to $P_2 P_A^{-1}$, the matrix $P_2$ is found by using Equation (29) and the matrix $P_A^{-1}$ is also found by using the matrix $P_2$. In this manner, the matrix $P_2$ and the matrix $P_A^{-1}$ are found separately.

The matrix can be determined so as to convert a white color of the known light source A into a white color of the light source 2. By using the spectral reflectivity data of the multiple colors such as those in the Munsell color chip, the LMS tristimulus values under the light source 2 and under the known light source A are found. The matrix for converting the tristimulus values $y_A$ into the tristimulus values $y_2$ are then found by using the least square method or the like. At this time, in order to convert the white color of the known light source A into the white color of the light source 2, matrices V and V' are found by decomposing the matrix to be found into a matrix V based on the chromatic adaptive prediction equation by von Kries and into a matrix V' which is normal to the tristimulus values $y_A$:

$$y_2 = (V_A + V_A') y_A \tag{38}$$

where $V_A' y_A = 0$.

In this case, $P_2 P_A^{-1} = V_A + V_A'$. By determining the matrix so that the white color of the known light source A can be converted into the white color of the light source 2, the white color under the known light source A can agree with the white color under the light source 2, which is more preferable. By finding the matrix $P_2$ according to Equation (29) and then by finding the matrix $P_A^{-1}$ by using the matrix $P_2$, the matrices $P_2$ and $P_A^{-1}$ can be obtained separately.

The parameter generating means 26 generates the processing parameter P for carrying out the color balance adjustment processing on the image data S0 from the known light source parameters stored in the database 25, based on the tristimulus values $L_{1w}$, $M_{1w}$, and $S_{1w}$ of the neutral point of the light source 1 and the tristimulus values of the neutral points of the known light sources having the neutral points close to the neutral point of the light source 1. Hereinafter, generation of the processing parameter P will be explained next.

Figure 5:
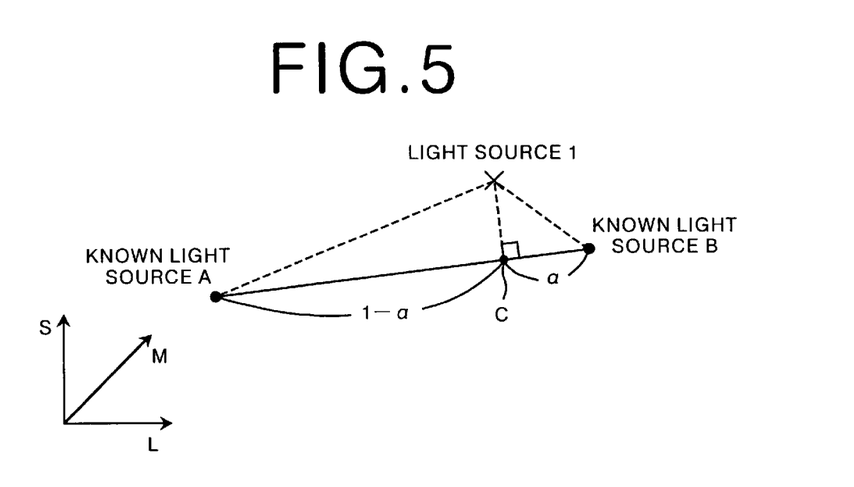
FIG. 5 is a diagram explaining how to generate processing parameters in an LMS color space (part 1)

The parameter generating means 26 finds a distance in the LMS color space between the tristimulus values $L_{1w}$, $M_{1w}$, and $S_{1w}$ of the neutral point input from the neutral point calculating means 24 and the tristimulus values of the neutral points of the known light sources stored in the database 25, and selects two of the known light sources having the distances shortest and second to the shortest. More specifically, the known light sources which are closer to the neutral point of the light source 1 in the LMS color space, that is, the known light sources which can be regarded as of the same type as the light source 1, are selected by plotting the tristimulus values of the neutral points of the known light sources stored in the database 25 and the tristimulus values $L_{1w}$, $M_{1w}$, and $S_{1w}$ in the LMS color space. Known light sources A and B are selected here, as shown in FIG. 5.

The known light source parameters of the known light source A are the matrix $P_2 P_A^{-1}$ in Equation (37) and known light source parameters of the known light source B are $P_2 P_B^{-1}$ in the following Equation (39):

$$y_2 = P_2 P_B^{-1} y_B \tag{39}$$

where $y_B$ is LMS tristimulus values under the known light source B and $P_B$ is a 3×3 matrix for finding the LMS values of the object having the spectral reflectivity $x(\lambda)$ observed under the light source B.

Like Equation (38) above, the parameters of the known light source B can be found according to the following Equation (40):

$$y_2 = (V_B + V_B') y_B \tag{40}$$

where $V_B' y_B = 0$.

Figure 6:
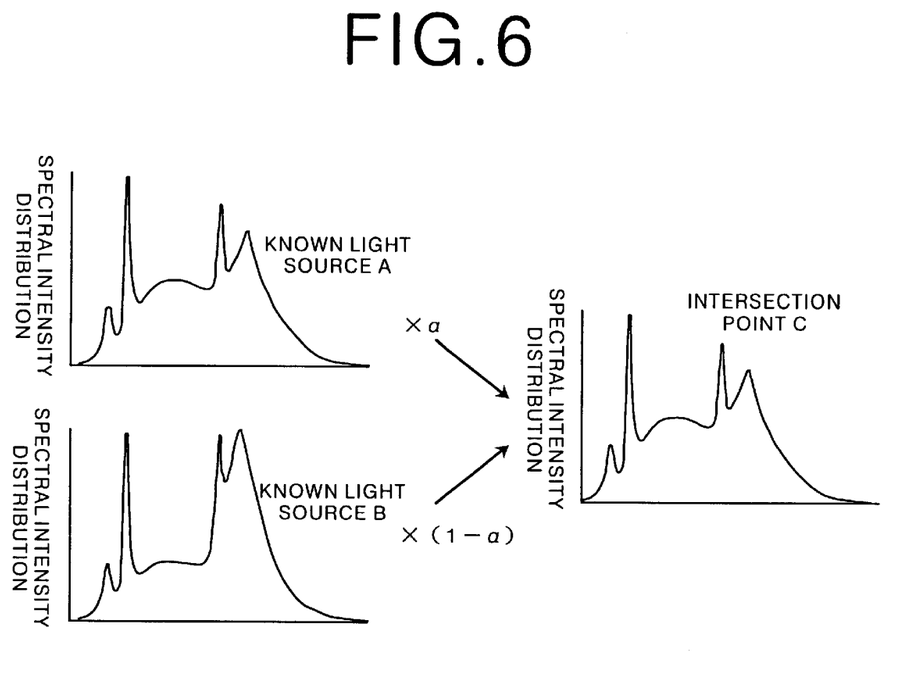
FIG. 6 is a diagram explaining how to generate the processing parameters in the LMS color space (part 2).

Once the two known light sources A and B are selected in the above manner, an intersection point C between a line AB connecting the neutral points (points A and B) of the known light sources A and B and a perpendicular to the line AB from the neutral point of the light source 1 (point X in FIG. 5) is found in the LMS color space. If the intersection point C divides the line AB into a ratio of $(1-\alpha): \alpha$, the intersection point C is equivalent to a neutral point of a light source having a spectral intensity distribution composed with the spectral intensity distributions of the known light sources A and B in a ratio of $\alpha:(1-\alpha)$, as shown in FIG. 6.

After the intersection point C has been found in the above manner, parameters of the light source corresponding to the intersection point C are calculated by carrying out an interpolation operation on the known light source parameters of the known light sources A and B.

More specifically, based on $\alpha$ calculated in the above manner, a matrix $P_c$ for converting the LMS tristimulus values under the light source corresponding to the intersection point C into the tristimulus values under the light source 2 is found according to Equation (41) below:

$$P_c = \alpha P_2 P_A^{-1} + (1-\alpha) P_2 P_B^{-1} \tag{41}$$

In the case where the matrices $P_2$, $P_A^{-1}$, and $P_B^{-1}$ are found separately, the matrix $P_c$ can be found according to the following Equation (41'):

$$P_c = P_2 (\alpha P_A + (1-\alpha) P_B)^{-1} \tag{41'}$$

Therefore, LMS tristimulus values $y_c$ under the light source corresponding to the intersection point C can be converted into the LMS tristimulus values under the light source 2 according to the following Equation (42):

$$y2 = P_c y_c \tag{42}$$

Meanwhile, the intersection point C is on the line AB connecting the neutral points of the known light sources A and B in the LMS color space and do not agree with the light source 1. Therefore, in order to convert a white color under the light source 1 into the white color under the light source 2, the matrix $P_c$ is corrected in the following manner. First, a correction matrix $\Delta P$ is added to the matrix $P_c$ so that the white color in the light source 1 can be converted into the white color under the light source 2 according to the Equation (43) below:

$$\begin{pmatrix} L_{2w} \\ M_{2w} \\ S_{2w} \end{pmatrix} = (P_C + \Delta P) \begin{pmatrix} L_{1w} \\ M_{1w} \\ S_{1w} \end{pmatrix} \quad (43)$$

where $L_{1w}$, $M_{1w}$, and $S_{1w}$ are the tristimulus values based on the physiological primary colors of the neutral point of the light source 1 and $L_{2w}$, $M_{2w}$, and $S_{2w}$ are the tristimulus values based on the physiological primary colors of the neutral point of the light source 2.

The matrix $P_c$ and $\Delta P$ are decomposed into the component V according to the chromatic adaptive prediction equation of von Kries from the light source 1 to the light source 2 and other components $Q_c$ and $\Delta Q$ as shown by Equations (44) and (45) below:

$$PC = QCV \quad (44)$$

$$\Delta P = \Delta Q V \quad (45)$$

Since the tristimulus values $L_{1w}$, $M_{1w}$, and $S_{1w}$ and the tristimulus values $L_{2w}$, $M_{2w}$, and $S_{2w}$ have the following relationship shown by Equation (46) below, substituting Equation (43) with Equations (44) and (45) yields Equation (47) below:

$$\begin{pmatrix} L_{2w} \\ M_{2w} \\ S_{2w} \end{pmatrix} = V \begin{pmatrix} L_{1w} \\ M_{1w} \\ S_{1w} \end{pmatrix} \quad (46)$$

$$\begin{pmatrix} L_{2w} \\ M_{2w} \\ S_{2w} \end{pmatrix} = (Q_C V + \Delta Q V) \begin{pmatrix} L_{1w} \\ M_{1w} \\ S_{1w} \end{pmatrix} \quad (47)$$

$$= (Q_C + \Delta Q) V \begin{pmatrix} L_{1w} \\ M_{1w} \\ S_{1w} \end{pmatrix}$$

$$= (Q_C + \Delta Q) \begin{pmatrix} L_{2w} \\ M_{2w} \\ S_{2w} \end{pmatrix}$$

The following Equation (48) is obtained by transforming Equation (47):

$$\Delta Q \begin{pmatrix} L_{2w} \\ M_{2w} \\ S_{2w} \end{pmatrix} = (E - Q_C) \begin{pmatrix} L_{2w} \\ M_{2w} \\ S_{2w} \end{pmatrix} \quad (48)$$

where E is a unit matrix.

From Equation (44), $$Q_c = P_c V^{-1} \quad (49)$$

is obtained, meaning the right side of Equation (48) is known. Therefore, replace $\Delta Q$ in the following manner:

$$\Delta Q = \begin{pmatrix} q_{00} & q_{01} & q_{02} \\ q_{10} & q_{11} & q_{12} \\ q_{20} & q_{21} & q_{22} \end{pmatrix} (E - Q_C) \begin{pmatrix} L_{2w} \\ M_{2w} \\ S_{2w} \end{pmatrix} = \begin{pmatrix} e_0 \\ e_1 \\ e_2 \end{pmatrix} \text{ and}$$

-continued $$(q_{00} \ q_{01} \ q_{02}) \begin{pmatrix} L_{2w} \\ M_{2w} \\ S_{2w} \end{pmatrix} = e_0$$

$$(q_{10} \ q_{11} \ q_{12}) \begin{pmatrix} L_{2w} \\ M_{2w} \\ S_{2w} \end{pmatrix} = e_1$$

$$(q_{20} \ q_{21} \ q_{22}) \begin{pmatrix} L_{2w} \\ M_{2w} \\ S_{2w} \end{pmatrix} = e_2$$

are obtained. If values of the vectors (q00, q01, q02), (q10, q11, q12), and (q20, q21, q22) become minimum, components in the correction matrix $\Delta P$ also become minimum. Therefore, by adding a minor correction to the matrix $P_c$, the neutral point under the light source 1 can be converted into the neutral point under the light source 2.

The values of the vectors (q00, q01, q02), (q10, q11, q12), and (q20, q21, q22) become minimum only in the case where these vectors are parallel to a vector ($L_{2w}$, $M_{2w}$, $S_{2w}$). Therefore, by determining the vectors (q00, q01, q02), (q10, q11, q12), and (q20, q21, q22) according to Equations (50)~(52) below, the matrix $\Delta Q$ can be found:

$$\begin{pmatrix} q_{00} \\ q_{01} \\ q_{02} \end{pmatrix} \frac{e_0}{|L_{2w} \ M_{2w} \ S_{2w}|^2} \begin{pmatrix} L_{2w} \\ M_{2w} \\ S_{2w} \end{pmatrix} \quad (50)$$

$$\begin{pmatrix} q_{10} \\ q_{11} \\ q_{12} \end{pmatrix} \frac{e_1}{|L_{2w} \ M_{2w} \ S_{2w}|^2} \begin{pmatrix} L_{2w} \\ M_{2w} \\ S_{2w} \end{pmatrix} \quad (51)$$

$$\begin{pmatrix} q_{20} \\ q_{21} \\ q_{22} \end{pmatrix} \frac{e_1}{|L_{2w} \ M_{2w} \ S_{2w}|^2} \begin{pmatrix} L_{2w} \\ M_{2w} \\ S_{2w} \end{pmatrix} \quad (52)$$

Therefore, the correction matrix $\Delta P$ can be found according to Equation (45) above. In this manner, a matrix M for converting the LMS tristimulus values under the light source 1 into the LMS tristimulus values under the light source 2 can be found by the following Equation (53):

$$M = P_c + \Delta P \quad (53)$$

The matrix M converts the tristimulus values of the neutral point under the light source 1 into the tristimulus values of the neutral point under the light source 2. Since the matrix M has been obtained by correcting the matrix $P_c$ for converting the LMS tristimulus values under the light source corresponding to the intersection point C into the LMS tristimulus values under the light source 2, the matrix M also has a characteristic of converting the LMS tristimulus values under the light source 1 into the LMS tristimulus values under the light source 2.

The matrix M having been generated in the above manner is input to the processing means 27 as the processing parameter P. In the processing means 27, the color signals R0', G0' and B0' comprising the inverse AWB image data S0' are converted into the signal values R11, G11, and B11 normalized according to Equations (33) and (34). The signal values R11, G11, and B11 are then converted into CIE1931XYZ tristimulus values X11, Y11, and Z11 according to Equation (54) below:

$$\begin{pmatrix} X11 \\ Y11 \\ Z11 \end{pmatrix} = \begin{pmatrix} 41.24 & 35.76 & 18.05 \\ 21.26 & 71.52 & 7.22 \\ 1.93 & 11.92 & 95.05 \end{pmatrix} \begin{pmatrix} R11 \\ G11 \\ B11 \end{pmatrix} \quad (54)$$

The tristimulus values X11, Y11, and Z11 are further converted into tristimulus values L11, M1 and S11 based on physiological primary colors according to Equation (55) below:

$$\begin{pmatrix} L11 \\ M11 \\ S11 \end{pmatrix} = \begin{pmatrix} 0.4002 & 0.7076 & -0.0808 \\ -0.2263 & 1.1653 & 0.0457 \\ 0.0 & 0.0 & 0.9182 \end{pmatrix} \begin{pmatrix} X11 \\ Y11 \\ Z11 \end{pmatrix} \quad (55)$$

The tristimulus values L11, M11, and S11 are converted by using the matrix M according to Equation (56) below, and converted tristimulus values L3, M3, and S3 are obtained:

$$\begin{pmatrix} L3 \\ M3 \\ S3 \end{pmatrix} = M \begin{pmatrix} L11 \\ M11 \\ S11 \end{pmatrix} \quad (56)$$

By carrying out inverse processing of Equations (55) and (56) on the converted tristimulus values L3, M3 and S3, the processed signals R3, G3, and B3 comprising the processed image data S3 are obtained.

In addition, all of the contents of Japanese Patent Application Nos. 11(1999)-231215 and 2000-173245 are incorporated into this specification by reference.

What is claimed is:

1. An image processing method for obtaining color-balance adjusted image data by carrying out color balance adjustment processing on white-balance adjusted image data obtained by carrying out, on original image data, white balance adjustment processing using gain adjustment in a color space in which the original image data have been obtained, the image processing method comprising the steps of:

obtaining inverse white-balance adjusted image data by carrying out, on the white-balance adjusted image data, inverse white balance adjustment processing which is inverse processing of the white balance adjustment processing; and obtaining the color-balance adjusted image data by carrying out the color balance adjustment processing on the inverse white-balance adjusted image data.

2. An image processing method as defined in claim 1, wherein the inverse white balance adjustment processing is carried out on the white-balance adjusted image data, based on information when carrying out the white balance adjustment processing.

3. An image processing apparatus for obtaining color-balance adjusted image data by carrying out color balance adjustment processing on white-balance adjusted image data obtained by carrying out, on original image data, white balance adjustment processing using gain adjustment in a color space in which the original image data have been obtained, the image processing apparatus comprising:

inverse processing means for obtaining inverse white-balance adjusted image data by carrying out, on the white-balance adjusted image data, inverse white balance adjustment processing which is inverse processing of the white balance adjustment processing; and color balance adjustment processing means for obtaining the color-balance adjusted image data by carrying out the color balance adjustment processing on the inverse white-balance adjusted image data.

4. An image processing apparatus as defined in claim 3, wherein the inverse processing means carries out the inverse white balance adjustment processing on the white-balance adjusted image data, based on information when carrying out the white balance adjustment processing.

5. A computer-readable recording medium storing a program to cause a computer to execute an image processing method for obtaining color-balance adjusted image data by carrying out color balance adjustment processing on white-balance adjusted image data obtained by carrying out, on original image data, white balance adjustment processing using gain adjustment in a color space in which the original image data have been obtained, the program comprising the procedures of:

obtaining inverse white-balance adjusted image data by carrying out, on the white-balance adjusted image data, inverse white balance adjustment processing which is inverse processing of the white balance adjustment processing; and obtaining the color-balance adjusted image data by carrying out the color balance adjustment processing on the inverse white-balance adjusted image data.

6. A computer-readable recording medium as defined in claim 5, wherein the procedure of obtaining the inverse white-balance adjusted image data is the procedure of obtaining the inverse white-balance adjusted image data by carrying out the inverse white balance adjustment processing on the white-balance adjusted image data, based on information when carrying out the white balance adjustment processing.

7. An output apparatus comprising the image processing apparatus as claimed in claim 3.

* * * * *